(12) United States Patent
Rosenberg

(10) Patent No.: US 10,122,775 B2
(45) Date of Patent: Nov. 6, 2018

(54) SYSTEMS AND METHODS FOR ASSESSMENT AND OPTIMIZATION OF REAL-TIME COLLABORATIVE INTELLIGENCE SYSTEMS

(71) Applicant: Unanimous A.I., Inc., San Francisco, CA (US)

(72) Inventor: Louis B. Rosenberg, San Luis Obispo, CA (US)

(73) Assignee: Unanimous A.I., Inc., San Francisco, CA (US)

( * ) Notice: Subject to any disclaimer, the term of this patent is extended or adjusted under 35 U.S.C. 154(b) by 423 days.

(21) Appl. No.: 14/859,035

(22) Filed: Sep. 18, 2015

(65) Prior Publication Data

US 2016/0057182 A1 Feb. 25, 2016

Related U.S. Application Data

(63) Continuation-in-part of application No. 14/738,768, filed on Jun. 12, 2015, and a continuation-in-part of
(Continued)

(51) Int. Cl.
*H04L 29/06* (2006.01)
*H04L 29/08* (2006.01)
(Continued)

(52) U.S. Cl.
CPC .......... *H04L 65/403* (2013.01); *E21B 47/122* (2013.01); *E21B 47/18* (2013.01);
(Continued)

(58) Field of Classification Search
CPC ..... H04L 65/403; H04L 67/14; H04L 67/125; H04L 67/10; H04L 67/12; G06F 3/0482;
(Continued)

(56) References Cited

U.S. PATENT DOCUMENTS

| 5,236,199 A | 8/1993 | Thompson, Jr. |
| 5,400,248 A | 3/1995 | Chisholm |

(Continued)

FOREIGN PATENT DOCUMENTS

| CA | 2414397 | 8/2003 |
| JP | 2010191533 | 9/2010 |

(Continued)

OTHER PUBLICATIONS

Ding et al. Time Weight Collaborative Filtering. CIKM'05, Oct. 31-Nov. 5, 2005, Bremen, Germany. pp. 485-492. (Year: 2005).*

(Continued)

*Primary Examiner* — Amy M Levy
(74) *Attorney, Agent, or Firm* — Fitch, Even, Tabin & Flannery LLP

(57) ABSTRACT

Systems and methods for real-time collaborative computing and collective intelligence are disclosed. A collaborative application runs on a collaborative server connected to a plurality of computing devices. Collaborative sessions are run wherein a group of independent users, networked over the internet, collaboratively answer questions in real-time, thereby harnessing their collective intelligence. A user performance value is determined for each of a plurality of independent users in the group based on each user's participation as compared to other users in the collaborative group. A group cohesiveness score is determined that quantifies the group's overall collaborative effectiveness. In some embodiments, the group cohesiveness score and user performance values are used to adjust weighting factors that affect the relative impact of each of the plurality of users in the collaborative group. In some embodiments, adjusting the weighting factors is performed with the objective of increasing the effectiveness of the resulting collective intelligence.

32 Claims, 9 Drawing Sheets

Related U.S. Application Data application No. 14/708,038, filed on May 8, 2015, and a continuation-in-part of application No. 14/668,970, filed on Mar. 25, 2015.

(60) Provisional application No. 62/066,718, filed on Oct. 21, 2014, provisional application No. 61/970,885, filed on Mar. 26, 2014, provisional application No. 61/991,505, filed on May 10, 2014, provisional application No. 62/012,403, filed on Jun. 15, 2014.

(51) Int. Cl.
| | |
|---|---|
| *G06F 3/0482* | (2013.01) |
| *G06F 3/0484* | (2013.01) |
| *G06F 17/30* | (2006.01) |
| *E21B 47/12* | (2012.01) |
| *E21B 47/18* | (2012.01) |

(52) U.S. Cl.
CPC ........ *G06F 3/0482* (2013.01); *G06F 3/04842* (2013.01); *G06F 3/04847* (2013.01); *G06F 17/30876* (2013.01); *H04L 67/10* (2013.01); *H04L 67/12* (2013.01); *H04L 67/125* (2013.01); *H04L 67/14* (2013.01)

(58) Field of Classification Search
CPC ........... G06F 3/04847; G06F 17/30876; G06F 3/04842; E21B 47/18; E21B 47/122
See application file for complete search history.

(56) References Cited

U.S. PATENT DOCUMENTS

| | | | |
|---|---|---|---|
| 5,808,908 | A | 9/1998 | Ghahramani |
| 6,064,978 | A | 5/2000 | Gardner |
| 6,480,210 | B1 | 11/2002 | Martino |
| 7,031,842 | B1 | 4/2006 | Musat |
| 7,158,112 | B2 | 1/2007 | Rosenberg |
| 7,489,979 | B2 | 2/2009 | Rosenberg |
| 7,542,816 | B2 | 6/2009 | Rosenberg |
| 7,562,117 | B2 | 7/2009 | Rosenberg |
| 7,603,414 | B2 | 10/2009 | Rosenberg |
| 7,831,928 | B1 | 11/2010 | Rose |
| 7,917,148 | B2 | 3/2011 | Rosenberg |
| 7,937,285 | B2 | 5/2011 | Goldberg |
| 8,176,101 | B2 | 5/2012 | Rosenberg |
| 8,589,488 | B2 | 11/2013 | Huston |
| 8,745,104 | B1 | 6/2014 | Rosenberg |
| 8,762,435 | B1 | 6/2014 | Rosenberg |
| 2002/0042920 | A1 | 4/2002 | Thomas |
| 2002/0171690 | A1 | 11/2002 | Fox |
| 2003/0065604 | A1 | 4/2003 | Gatto |
| 2003/0079218 | A1 | 4/2003 | Goldberg |
| 2004/0210550 | A1* | 10/2004 | Williams ............. G06Q 10/105 |
| 2005/0067493 | A1 | 3/2005 | Urken |
| 2005/0168489 | A1 | 8/2005 | Ausbeck |
| 2005/0218601 | A1 | 10/2005 | Capellan |
| 2005/0261953 | A1 | 11/2005 | Malek |
| 2006/0147890 | A1 | 7/2006 | Bradford |
| 2006/0200401 | A1 | 9/2006 | Lisani |
| 2006/0250357 | A1 | 11/2006 | Safai |
| 2007/0039031 | A1 | 2/2007 | Cansler, Jr. |
| 2007/0097150 | A1 | 5/2007 | Ivashin |
| 2007/0099162 | A1 | 5/2007 | Sekhar |
| 2007/0124503 | A1 | 5/2007 | Ramos |
| 2007/0211050 | A1 | 9/2007 | Ohta |
| 2007/0220100 | A1 | 9/2007 | Rosenberg |
| 2008/0103877 | A1 | 5/2008 | Gerken |
| 2009/0037355 | A1 | 2/2009 | Brave |
| 2009/0063379 | A1 | 3/2009 | Kelly |
| 2009/0063463 | A1 | 3/2009 | Turner |
| 2009/0063991 | A1* | 3/2009 | Baron .................... G06Q 10/10 715/751 |
| 2009/0063995 | A1 | 3/2009 | Baron |
| 2009/0239205 | A1 | 9/2009 | Morgia |
| 2009/0254836 | A1 | 10/2009 | Bajrach |
| 2009/0287685 | A1 | 11/2009 | Charnock |
| 2009/0325533 | A1 | 12/2009 | Lele |
| 2010/0145715 | A1 | 6/2010 | Cohen |
| 2010/0169144 | A1 | 7/2010 | Estill |
| 2010/0174579 | A1 | 7/2010 | Hughes |
| 2010/0299616 | A1 | 11/2010 | Chen |
| 2011/0016137 | A1 | 1/2011 | Goroshevsky |
| 2011/0080341 | A1 | 4/2011 | Helmes |
| 2011/0087687 | A1 | 4/2011 | Immaneni |
| 2011/0119048 | A1 | 5/2011 | Shaw |
| 2011/0141027 | A1 | 6/2011 | Ghassabian |
| 2011/0166916 | A1 | 7/2011 | Inbar |
| 2012/0005131 | A1 | 1/2012 | Horvitz |
| 2012/0011006 | A1 | 1/2012 | Schultz |
| 2012/0013489 | A1 | 1/2012 | Earl |
| 2012/0079396 | A1 | 3/2012 | Neer |
| 2012/0109883 | A1 | 5/2012 | Lordanov |
| 2012/0191774 | A1 | 7/2012 | Bhaskaran |
| 2012/0290950 | A1 | 11/2012 | Rapaport |
| 2013/0013248 | A1 | 1/2013 | Brugler |
| 2013/0041720 | A1 | 2/2013 | Spires |
| 2013/0097245 | A1 | 4/2013 | Adarraga |
| 2013/0160142 | A1 | 6/2013 | Lai |
| 2013/0171594 | A1 | 7/2013 | Gorman |
| 2013/0231595 | A1 | 9/2013 | Zoss |
| 2013/0298690 | A1 | 11/2013 | Bond |
| 2013/0311904 | A1 | 11/2013 | Tien |
| 2013/0339445 | A1 | 12/2013 | Perincherry |
| 2014/0057240 | A1 | 2/2014 | Colby |
| 2014/0100924 | A1 | 4/2014 | Ingenito |
| 2014/0108915 | A1 | 4/2014 | Lu |
| 2014/0128162 | A1 | 5/2014 | Arafat |
| 2014/0129946 | A1 | 5/2014 | Harris |
| 2014/0162241 | A1 | 6/2014 | Morgia |
| 2014/0249889 | A1 | 9/2014 | Park |
| 2014/0258970 | A1 | 9/2014 | Brown |
| 2014/0279625 | A1 | 9/2014 | Carter |
| 2014/0337097 | A1* | 11/2014 | Farlie ................. G06Q 30/0203 705/7.32 |
| 2014/0358825 | A1 | 12/2014 | Phillipps |
| 2014/0379439 | A1 | 12/2014 | Sekhar |
| 2015/0089399 | A1 | 3/2015 | Megill |
| 2015/0156233 | A1 | 6/2015 | Bergo |
| 2015/0170050 | A1 | 6/2015 | Price |
| 2015/0302308 | A1 | 10/2015 | Bartek |
| 2015/0331601 | A1 | 11/2015 | Rosenberg |
| 2015/0347903 | A1 | 12/2015 | Saxena |
| 2016/0078458 | A1 | 3/2016 | Gold |
| 2016/0170616 | A1 | 6/2016 | Rosenberg |
| 2016/0210602 | A1 | 7/2016 | Siddique |
| 2016/0366200 | A1 | 12/2016 | Healy |
| 2017/0223411 | A1 | 8/2017 | De Juan |

FOREIGN PATENT DOCUMENTS

| | | |
|---|---|---|
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |

OTHER PUBLICATIONS

Beni; "From Swarm Intelligence to Swarm Robotics"; Swarm Robotics WS 2004, LNCS 3342; pp. 1-9; 2005.
Rosenberg; U.S. Appl. No. 15/199,990, filed Jul. 1, 2016.
Rosenberg; U.S. Appl. No. 15/241,340, filed Aug. 19, 2016.
Salminen; "Collective Intelligence in Humans: A Literature Review"; Lappeenranta University of Technology, Lahti School of Innovation; 1Proceedings; 2012; 8 pages.
Unanimous A. I.; "What is Swarm Intelligence"; 2015; http://unu.ai/swarm-intelligence/; downloaded Oct. 6, 2016; 3 pages.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.

(56) References Cited

OTHER PUBLICATIONS

PCT; International Search Report and Written Opinion of the International Searching Authority for PCT/US2017/040480 dated Oct. 23, 2017.
Rosenberg; "Human Swarms, a real-time method for collective intelligence"; Proceedings of the European Conference on Artificial Life; Jul. 2015; pp. 658-659.
USPTO; Non-Final Office Action for U.S. Appl. No. 16/668,970 dated Aug. 15, 2017.
Yeung et al.; "Metacognition in human decision-making: confidence and error monitoring"; Philosophical Transactions of the Royal Society B; 2012; pp. 1310-1321.
PCT; International Search Report and Written Opinion of the International Searching Authority for PCT/US2016/040600 dated Nov. 29, 2016.
"Dialogr—A simple tool for collective thinking"; Mar. 25, 2015; http://www.dialogr.com./; 1 page.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room"; Outland Pictures; Amazon; Mar. 30, 2014; 110 pages.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/920,819, filed Oct. 22, 2015.
Rosenberg; U.S. Appl. No. 14/925,837, filed Oct. 28, 2015.
Souppouris; "Playing 'Pokemon' with 78,000 People is Frustratingly Fun"; The Verge; Feb. 17, 2014; http://www.theverge.com/2014/2/17/5418690/play-this-twitch-Plays-Pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-oulja-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
PCT; International Search Report and Written Opinion of the International Searching Authority for PCT/US2015/56394 dated Feb. 4, 2016.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
USPTO; Non-Final Office Action for U.S. Appl. No. 14/738,768 dated Sep. 8, 2017.
EP; Extended European Search Report for EP Application No. 15767909.3 mailed from the European Patent Office dated Sep. 4, 2017.
Rosenberg: U.S. Appl. No. 15/959,080, filed Apr. 20, 2018.
USPTO; Non-Final Office Action for U.S. Appl. No. 14/920,819 dated Jun. 27, 2018.
Rosenberg; U.S. Appl. No. 15/898,468, filed Feb. 17, 2018.
Rosenberg; U.S. Appl. No. 15/904,239, filed Feb. 23, 2018 .
USPTO; Non-Final Office Action for U.S. Appl. No. 14/708,038 dated Feb. 15, 2018.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
PCT; International Search Report and Written Opinion of the International Searching Authority for PCT/US2017/062095 dated May 23, 2018.
USPTO; Final Office Action for U.S. Appl. No. 15/086,034 dated Jul. 17, 2018.
USPTO; Non-Final Office Action for U.S. Appl. No. 15/241,340 dated Jul. 19, 2018.
EP; Extended European Search Report for EP Application No. 15852495.9 mailed from the European Patent Office dated Mar. 21, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
USPTO; Non-Final Office Action for U.S. Appl. No. 14/925,837 dated Apr. 3, 2018.
EP; Extended European Search Report for EP Application No. 15808982.1 mailed from the European Patent Office dated Nov. 28, 2017.
USPTO; Non-Final Office Action for U.S. Appl. No. 15/047,522 dated Jan. 5, 2018.

\* cited by examiner

SYSTEMS AND METHODS FOR ASSESSMENT AND OPTIMIZATION OF REAL-TIME COLLABORATIVE INTELLIGENCE SYSTEMS

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application 61/970,855 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI—GROUP METHODS AND SYSTEMS FOR REAL-TIME MULTI-TIER COLLABORATIVE INTELLIGENCE, filed May 8, 2015, which in turns claims the benefit of U.S. Provisional Application 61/991,505 entitled METHOD AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turns claims the benefit of U.S. Provisional Application No. 62/012,403 entitled AN INTUITIVE INTERFACE FOR REAL-TIME COLLABORATIVE CONTROL, filed Jun. 15, 2014, both of which are incorporated in their entirety herein by reference.

BACKGROUND OF THE INVENTION

1. Field of the Invention

The present invention relates generally to systems and methods for collaborative intelligence, and more specifically to systems and methods for closed-loop, dynamic collaborative intelligence.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a method for determining a performance value of at least one individual user participating as part of a group of members in real-time collaborative control of at least one graphical object, each user of the group interacting with one of a plurality of computing devices, each computing device configured to exchange data with a collaboration server, the collaboration server performing the steps of: receiving repeatedly from each of the plurality of computing devices, at least one real-time user intent derived from user input to the computing device and indicating a desired motion of the at least one graphical object; determining, repeatedly in real-time, at least one group intent derived from the plurality of real-time user intents received from the plurality of computing devices; updating, repeatedly in real-time, a displayed location, on a display of each of the plurality of computing devices, of the at least one graphical object based at least in part upon the at least one group intent; determining, repeatedly, a comparison between the at least one real-time user intent of each of the at least one individual user and at least one of the at least one group intent; and determining the user performance value for each at least one individual user based at least in part upon the repeated comparisons, whereby the user performance value for each at least one individual user represents at least in part that user's contribution to the collaborative control of the at least one graphical object.

In another embodiment, the invention can be characterized as a method for determining a group cohesiveness score of a group of members participating in the real-time collaborative control of at least one graphical object, each user of the group of individual users associated with and interacting with an individual computing device that exchanges data with a collaboration server, the collaboration server performing the steps of: receiving repeatedly from each of the computing devices, at least one real-time user intent value reflecting the associated individual user's current user input regarding a desired motion of the at least one graphical object;

updating a simulated location, on a display of each computing device, of the at least one graphical object based at least in part upon the plurality of real-time user intent values received from the plurality of computing devices; and determining, repeatedly in real-time, a group cohesiveness score based at least in part on the plurality of real-time user intent values received from the plurality of computing devices, the group cohesiveness score based at least in part upon alignment between the plurality of real-time user intent values received from the plurality of individual users.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
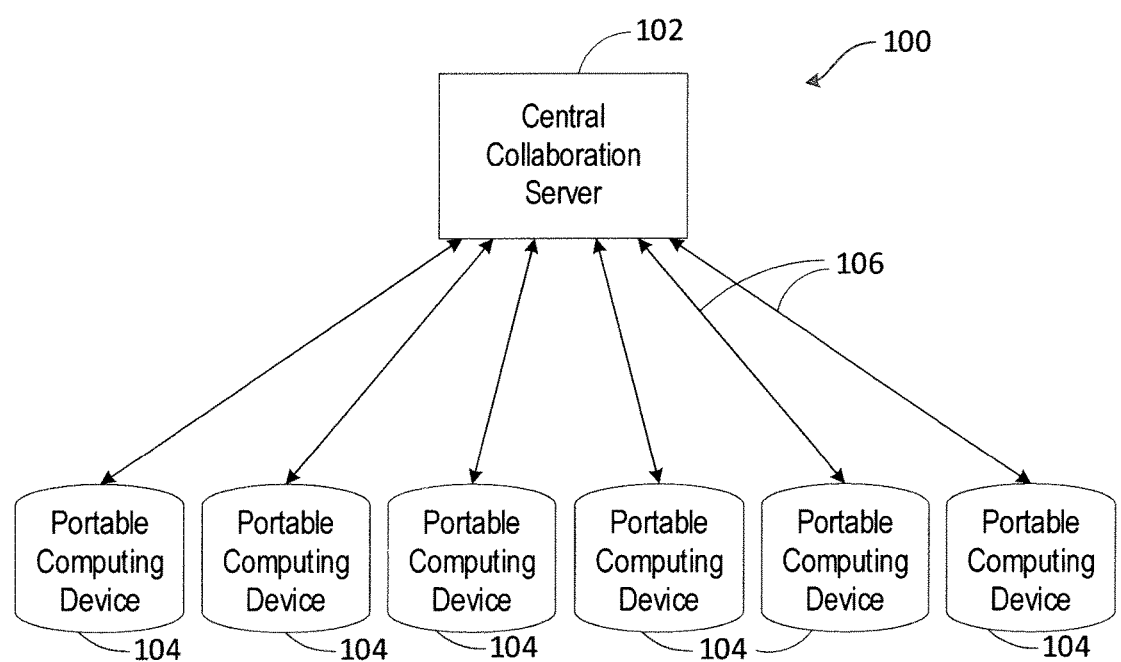
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

As described in related patent application Ser. Nos. 14/668,970, 14/708,038 and 14/473,768, the massive connectivity provided by the internet is used to create a real-time closed-loop collaborative consciousness (or emergent group-wise intelligence) by collecting real-time input from large numbers of people through a novel user interface and processing the collected input from that large number of users into a singular group intent that can collectively answer questions, make statements, take actions, select functions, or otherwise respond to prompts in real time. The methods use intervening software and hardware to moderate the process, closing the loop around the disparate input from each of the many individual participants and the singular output of the group.

A collaboration system has been developed that allows the group of users to collaboratively control a graphical pointer 210 in order to collaboratively answer questions or otherwise respond to prompts. In one embodiment, each individual user ("participant") engages the user interface on a computing device 104, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees the graphical pointer 210 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device 104 at substantially the same time. While the embodiments described generally refer to portable computing devices, it will be understood that non-portable computing devices, such as desktop computers, may also be used.

Using the disclosed systems and methods, a "social swarming" platform is enabled that allows users to join one of a plurality of hosted groups (also referred to as swarms), each group comprising a plurality of users. The user may collaborate with that group, earn scores and/or credits and/or rankings based on his performance with respect to others in the group, and browse the stored output from other groups. In some embodiments, groups can compete with other groups, each of said groups also earning group scores, credits, and/or rankings with respect to other groups.

Referring first to FIG. 1, a schematic diagram of an exemplary collaboration system 100 is shown. Shown are a Central Collaboration Server (CCS) 102, the plurality of portable computing devices 104, and a plurality of exchanges of data with the Central Collaboration Server 102.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running a Collaborative Intent Application ("CIA"). The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices 208. The computing device 104 could be, for example, a personal computer running the CIA application. It could also be a mobile device such as a smart phone, tablet, headset, smart-watch, or other portable computing device running the CIA. The CIA software code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Figure 2:
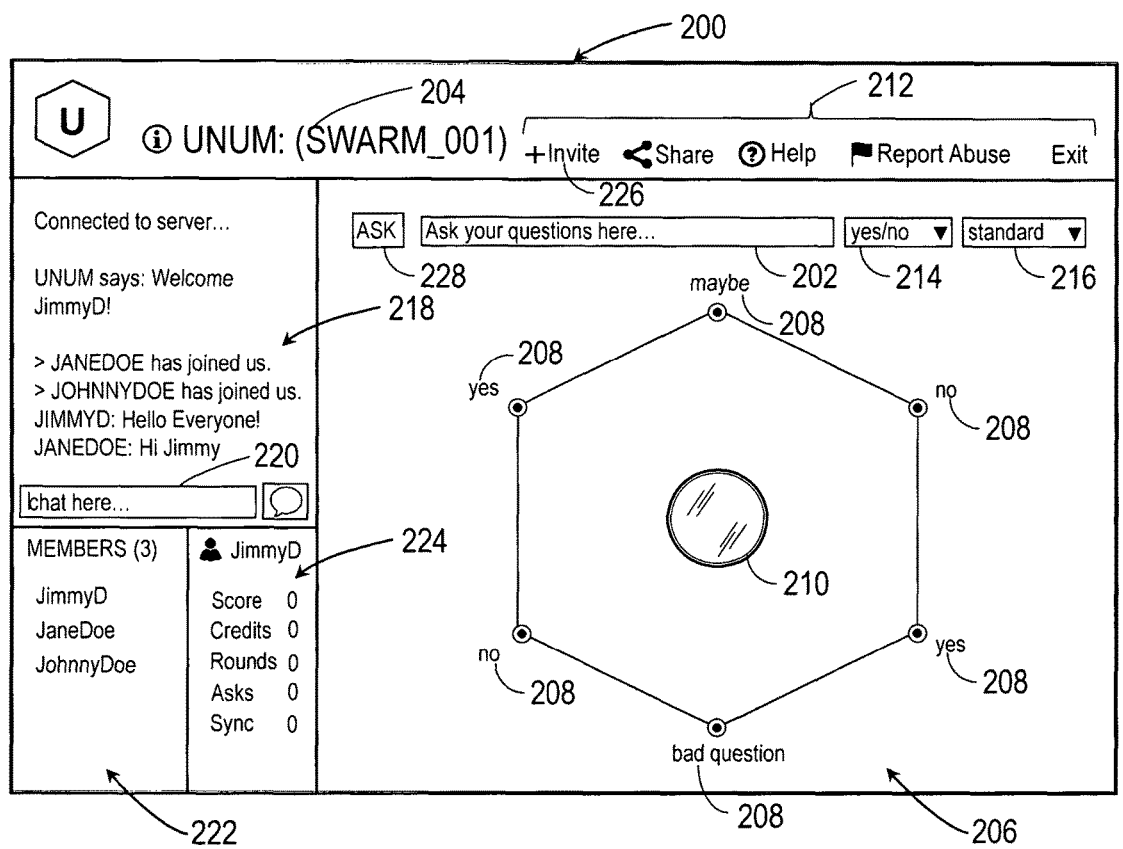
FIG. 2 is an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, a plurality of input choices 208, the pointer 210, a communication menu 212, a board selection drop-down menu 214, a physics selection drop-down menu 216, a chat window 218, a chat input box 220, a current member list 222, a statistics display 224, an invite button 226, and an ask button 228.

The graphical pointer 210 is simultaneously displayed to each user by the CIA running on his computing device 104. The pointer 210 displayed to each user appears in a substantially similar position with respect to a set of input choices 208 (as compared to the position of the pointer 210 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below.

In general, the input choices 208 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

As shown in FIG. 2, the CIA software running on each computing device 104 is configured to display a graphical display interface 200 that includes at least one graphical pointer 210 and the plurality of spatially arranged graphical input choices 208. In the example shown, the graphical pointer 210 is configured to look like a "glass puck" with a central viewing area that is transparent. In the example shown, the input choices 208 are configured as a hexagon of six input choices 208, each input choice 208 including a graphical icon (in the embodiment shown, a dot inside a circle) and an associated word. In this case, the six input choices 208 correspond with possible answers to questions: "Yes", "Maybe", "No", "Yes", "Bad Question", and "Nc". When the pointer 210 is positioned over one of the input choices 208 such that the input choice 208 is substantially within a centralized viewing area of the pointer 210 for more than a threshold amount of time, that input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six targets for more than the threshold amount of time, that input choice 208 is selected as the answer to a previously asked question.

To ask a question, the user enters the question into the prompt bar 202. Once entered, the user clicks the ask button 228, which sends the question from the CIA software of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores. The methods for computing sync scores will be described in more detail further below.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a location substantially near a center of the input choice set (i.e. center screen) as if by simulated gravity. In a heavy mode the pointer 210 has substantially higher mass than in standard mode and thus is harder for users to collectively move. In a barrier mode, a set of physical barriers block a direct path to the input choices 208, forcing users to collaboratively guide the pointer 210 around barriers to reach the input choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA of each computing device 104. In some embodiments, in response to receiving the failure indication the CIA terminating user input and displaying the words "brain freeze!" on the group interface. In addition, in response to receiving the failure indication all users could lose a number of points and/or credits for the collective failure of the group to guide the pointer 230 to a target.

Figure 4:
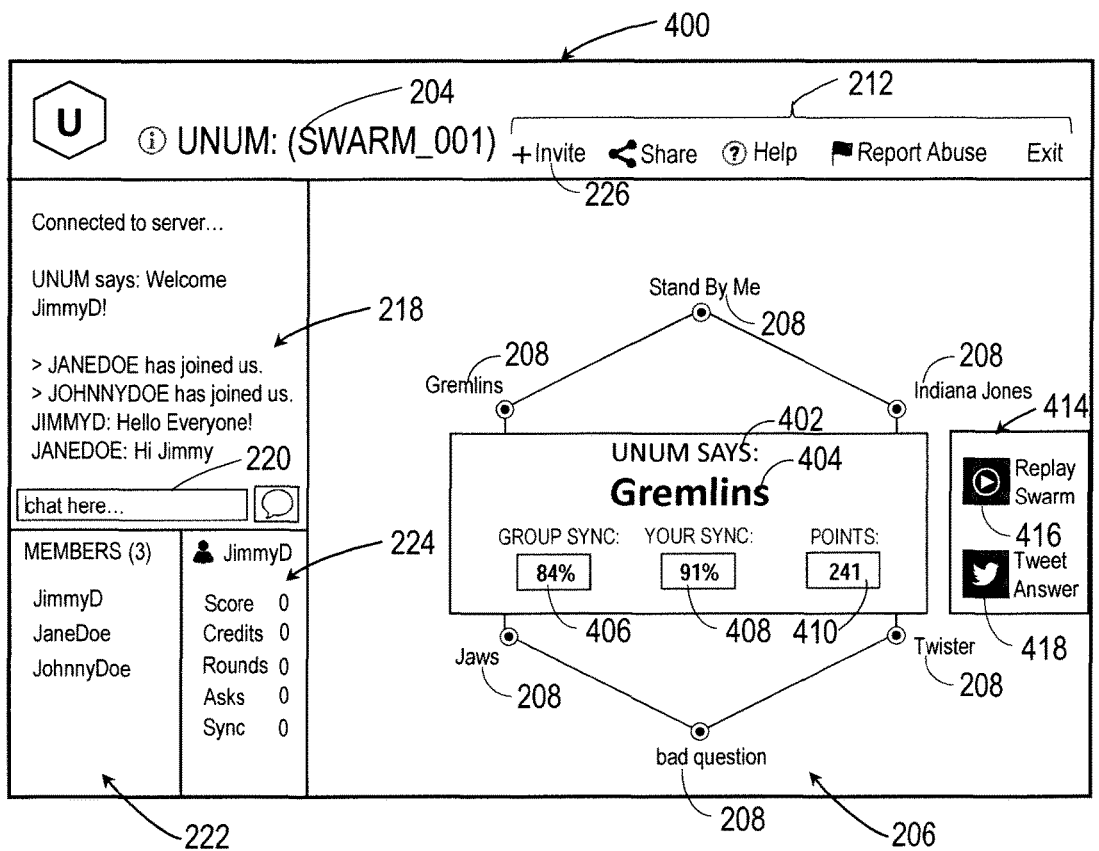
FIG. 4 is an exemplary group display interface of the computing device of the collaborative system after the collaboration session has been successfully completed.

The system 100 is configured to determine that a target is achieved when the group successfully positions the pointer 210 over one input choice 208 for more than the threshold period of time. When the group targets one input choice 208, the target is displayed on the CIA screens of all the users as the answer to the question. Also displayed may be statistics for that answer as shown below in FIG. 4, such as the group cohesiveness score and the user synchronicity value, as previously described in related application Ser. No. 14/708,038. Also displayed may be points and/or credits awarded for the current user's participation in the emergent answer, as shown in FIG. 4.

Figure 3:
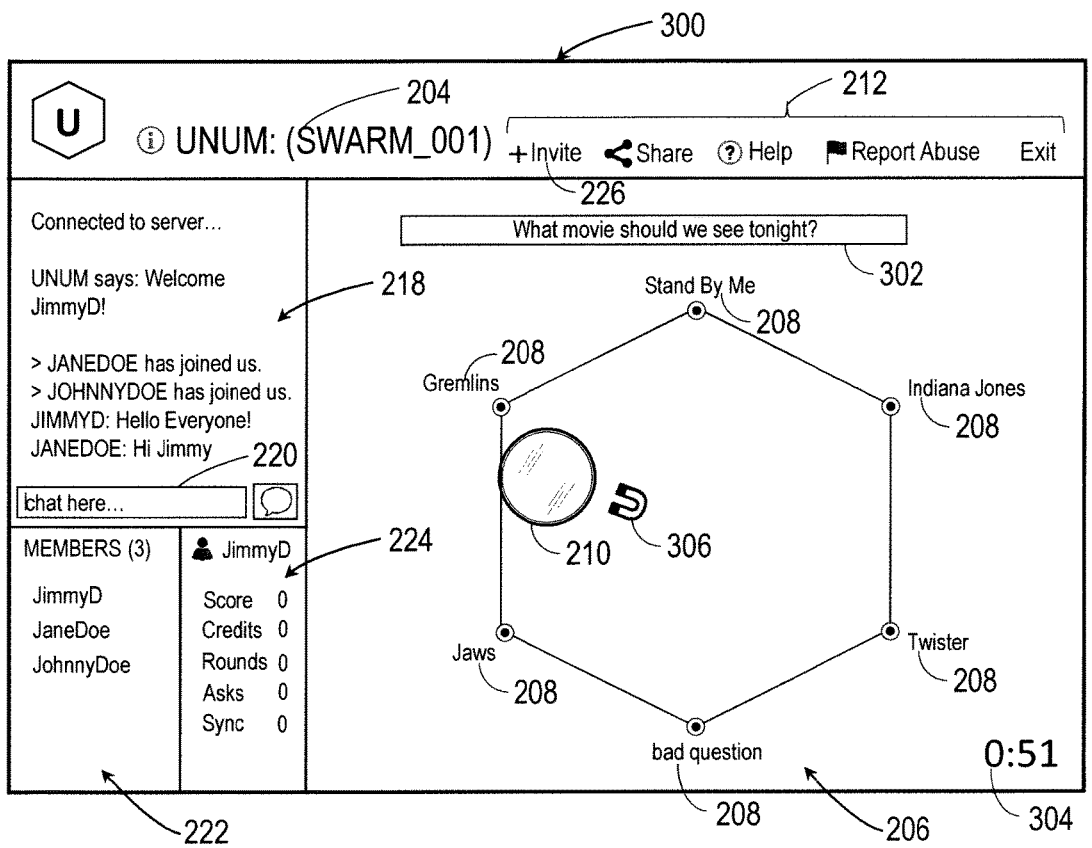
FIG. 3 is an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of input choices 208 from which the users are being asked to collaboratively select from. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"-"2"-"1" countdown timer appears (not shown) to signal the start of the current session. When the session begins, the users are now enabled to provide user input to the pointer 210, guiding it towards one of the input choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/473,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA is configured to operate the eye tracking hardware and software and receive input from the eye tracking hardware are software. In the current innovation, a user's gaze is tracked by the CIA and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA to compute the magnitude and direction of the user intent vector. In this way, the user can simply look towards a direction that he desires the pointer 210 to move, and the user intent vector is computed by the CIA and sent to the CCS 102 software by the CIA. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 202 software by the CIA. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the input choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values or performance values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity). The synchronicity value may be an instant synchronicity value, i.e. one at a certain instant in time, or may be a session synchronicity value representing the overall user synchronicity for one or more sessions.

Figure 9:
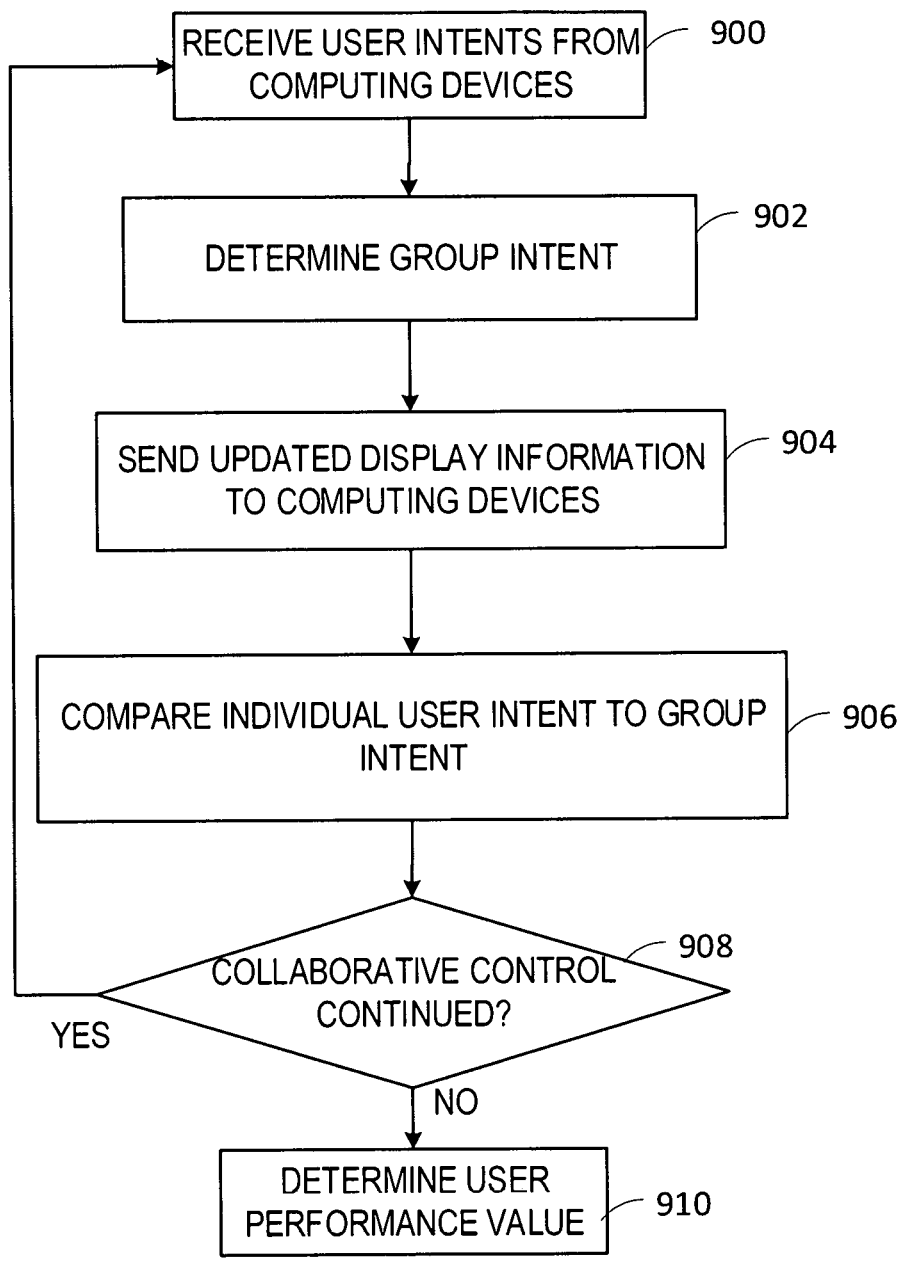
FIG. 9 is a flowchart of an exemplary method for determining a performance value for a user in one embodiment of the present invention.

Referring next to FIG. 9, a flowchart of an exemplary method for determining the performance value for a user is shown. In the first receive user intents step 900, the CCS 102 receives the user intents from the plurality of users during the collaborative session as previously described. In the next determine group intent step 902, the CCS 102 determines the group intent from the plurality of user intents, as previously described. Next, in the send updated display information step 904, the CCS 102 sends to the plurality of computing devices 104 updated display information based on the group intent, as previously described.

In the next compare user intent to group intent step 906, the CCS 102 compares one or more user intents to the group intent determined in step 902. The method then proceeds to the continue collaborative control decision point 908. As previously described, the collaborative control steps are repeated during the session. If the collaborative session is continued, the method returns to step 900 and the method repeats. If the collaborative session is not continued, the method proceeds to determine user performance value step 910, and the CCS 102 determines the user performance value, for each user whose user intent was compared to the group intent in step 906, based at least in part on the repeated user intent-group intent comparisons of step 906.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined by computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent.

A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm. This is described in more detail later in this document.

In some embodiments, an average (or mean) synchronicity value is computed for the user over some number of prior questions. For example a "sync_5" synchronicity value can be computed as that user's average synchronicity value (also referred to as the average performance value) over the last five sessions. This is a highly useful value for it indicates how cooperative the user has been over a recent period of time. The "sync_5" synchronicity value can be used in combination with other time-histories, such as a "sync_5" synchronicity value which indicates the average synchronicity value for that user over the last 50 sessions, in order to compute that user's weighting value in the swarm. In some embodiments, the mean synchronicity value may be time-weighted such that time steps near the end of the session time period are more heavily weighted than time steps near the start of the time period.

In some embodiments, the CCS 102 determines at least one user assessment based at least in part upon one of more user synchronicity values. For examples, one assessment may be configured to determine whether the user is categorized as "flexible" or "entrenched". In another example, one assessment may be configured to determine whether the user is "constructive" or "destructive".

Referring next to FIG. 4, shown is an exemplary display interface 400 as displayed on the computing device 104 being used by one user of a group, shown at a moment in time after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Related application Ser. No. 14/708,038 discloses some methods of computing the group cohesiveness score, such as to compute a running average of the absolute value (i.e. magnitude) of the group intent vector over time. The group cohesiveness score may have an upper bound and a lower bound, wherein a group cohesiveness score at the upper bound indicates that the plurality of real-time user intents are substantially aligned with each other, and a group cohesiveness score at the lower bound indicates that the plurality of real-time user intent values are substantially misaligned with each other. In one embodiment, the lower bound is essentially 0, as the summation of the user intent vectors, being opposite (exactly misaligned), cancel each other out.

In some embodiments, the CCS 102 determines at least one group assessment based at least in part upon one of more group cohesiveness scores. For examples, one assessment may be configured to determine whether the group is categorized as "flexible" or "entrenched".

The group cohesiveness score may be repeatedly calculated by the CCS 102 during the session and repeatedly received by each of the portable computing devices 104.

In another embodiment, the real-time user intent values are determined to be substantially aligned with each other (i.e. at or near the upper bound) when their vector directions are substantially the same in at least a plane. The real-time user intent values are determined to be substantially misaligned with each other (i.e. at or near the lower bound) when a summation of their vector directions substantially cancel each other out, resulting in a near zero resultant.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence. This imposes a philosophical situation often referred to as a Prisoner's Dilemma and structures it uniquely such that group collaboration and consensus trumps group stagnation and entrenchment. In this way, the present invention helps groups to find common ground.

Also displayed is the answer options tab 414 which gives users options related to the answer that was just reached by the swarm. The user can selectively Tweet the answer by selecting the Tweet answer icon 418. This triggers a routine within the CIA that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "#UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The session replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
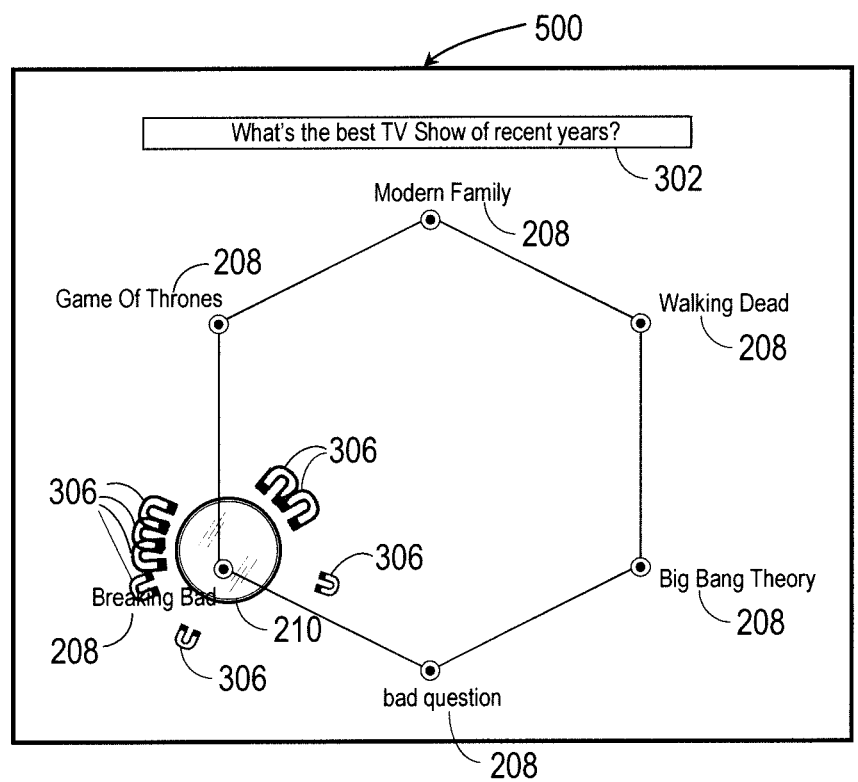
FIG. 5 is a frame of an exemplary collaboration session replay video

Referring next to FIG. 5, a frame of an exemplary session replay video 500 is shown. Shown are the target area 206, the plurality of input choices 208, the question display 302, and the plurality of magnet icons 306.

As shown in FIG. 5, the session replay includes the question asked, the input choices 208, and the graphical indication of the trajectory taken by the pointer 210 during the answer period. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed. In some embodiments, the software running on the local user's computing device 104 can be configured to show all magnet icons 306 in the replay as a uniform color except for the magnet icon 306 representing the time-history of that particular user's input. For that user, the magnet icon 306 can be shown as an alternate color with visual contrast. In this way, the user can observe the swarm of many magnet icons 306 as the history of the session is replayed and identify his or her own magnet icon* among the swarm of many magnet icons 306 because his own magnet icon 306 is displayed in the alternate color. To enable this, the local software on each computing device 104 is configured to identify which magnet icon 306 in the replay is associated with the user of that computing device 104. Such identification can be achieved by associating each magnet icon 306 in the replay with a unique user ID value stored in memory.

As disclosed herein, the present invention employs a number of inventive systems and/or methods for dynamically modifying the configuration of the group to optimize the performance of that group over time. More specifically, each group is a collection of intelligent members (users) that are networked together in real-time, each of them providing collaborative input that's numerically combined into a singular intelligent output. To optimize the performance of a given group, a number of approaches have been developed, which can be used alone or in combination.

A first approach is to dynamically modify the swarm population by purging the swarm of one or more of its currently low-performing members (the input from said members determined to be substantially out of sync with collaborative will of the swarm, i.e. having a low synchronicity value) and/or setting a statistical threshold associated with a given group that bars non-compatible and/or low-performing members from joining that given group. These techniques modulate the make-up the group in real time, by filtering the addition of new members and/or moderating the ejection of low-performing members, all with the goal of maintaining a group configuration that behaves with high levels of collaboration.

A second approach is to dynamically modify the connection strengths within a given group population by adjusting the weighting assigned to the inputs from each individual user, the weightings assigned to each given user being modulated to improve overall group performance. More specifically, the CCS 102 software is selectively configured to increase the weighting of inputs from high-performing members of the group in terms of their collaborative behavior, and decrease the weightings of inputs from low-performing members of a swarm in terms of their collaborative behavior.

In order for the CCS 102 to purge users from the group, institute thresholds that limit entry into the group, and/or dynamically modify the connection strengths within the group, the CCS 102 must quantify swarm performance as well as user performance in the context of collaboration, for determining levels of collaborative performance is used as the basis for dynamic modulation of the group. To perform such quantification, the group cohesiveness score (representing the group synchrony) and the user synchronicity value (synchrony value) is used.

In the context of the collaborative swarming inventions disclosed herein, and as disclosed in the related applications, "synchrony" is defined as a statistical measure of collaboration within and among members of a real-time networked swarm. More specifically, "synchrony" is determined computationally by the software running on the CCS 102 based on the degree of alignment (in direction and magnitude) among the user input collected from all member of a swarm during a response. Because the degree of alignment changes at every time-step, the software running on the CCS 102 is configured to integrate over the response period, producing time-weighted average. In this way, the synchrony computed during a single question/answer session is the time-weighted average of the instantaneous synchrony (i.e. alignment among input vectors) across all time steps.

Further, the two types of synchrony are computed by the CCS 102 software and communicated to each of the peers: group synchrony and individual synchrony. These are described in detail as follows:

As previously disclosed in application Ser. No. 14/708,038, the group cohesiveness score is an indication of the collaborative coordination of the group as it answers a question or completes a task, derived by computing the degree of alignment among the full set of user intent vectors from all participating users in the group, integrated across all time steps of the session. In many current embodiments, this value is expressed as a percentage between 0% and 100%. In many embodiments, the computation is configured such that if, in theory, all of the users of a group coordinate perfectly during the session (i.e. all users impart input vectors of the exact same magnitude and direction at every time step across the session), that group would deemed to have a group cohesiveness score of 100%. In practice, this rarely happens. Ideally, the outcome of the session is one where the central tendency of the group leads to a coherent answer through the motion of the pointer 210. This generally translates into a group cohesiveness score between 65% and 90%. Conversely, if all members of the group are pulling in the exact opposite directions (i.e. all user intent vectors perfectly cancel out), the pointer 210 will not move at all, resulting in a stalemate. This translates into the group cohesiveness score of 0%. In practice, this too rarely happens. That said, the inventive system still identifies unproductive swarms where the pointer 210 sputters, moving in one direction and another, but never finds enough consensus to drive the pointer 210 to the answer. Such sessions generally have the group cohesiveness score of between 10% and 35%.

Thus, an effective group will have the high group cohesiveness score (>65%), while an ineffective group, unable to converge on answers will have the low group cohesiveness score (<35%). Groups with the group cohesiveness score of around 50% will generally converge on coherent answers, but the group's "conviction" in those answers will not be as strong as sessions with the higher group cohesiveness score. To encourage convergent groups, the CCS 102 software is configured to measure and report the group cohesiveness score to every user after every session (i.e. every collaborative answer). By giving users a direct and easy to understand measure of the collaborative coherence of the group, they can understand if the group is performing well together and adapt their actions accordingly. Further, when points (or credits) are awarded to members of the group, the points are scaled by group cohesiveness score. Thus all users are rewarded when the group shows high synchrony (i.e. strong collaboration) by having a high group cohesiveness score, for they were able to converge on an answer with high conviction. By rewarding individual members for the level of cooperation achieved across the group, all users are incentivized to seek common ground, guiding the pointer 210 to the answer that best satisfies the collaborative will of the entire group. This is a very powerful and important method of driving coherent group.

Of course some users may be deliberately divergent, while other users will be contributing greatly to the overall cohesion of the swarm. To quantify these differences, we compute the user synchronicity value for every user. Like the group cohesiveness score indicating the degree of group synchrony, the user synchronicity value is a time-weighted average that's integrated across all time steps, but in this case the synchronicity value is a measurement of how well aligned a single user is with respect to the group as a whole. Because the synchronicity value is personalized for each user, the CCS 102 software must compute the user synchronicity value independently for each member in the group, indicating how well aligned that user's input vector was with the overall group input vector. The user with the high synchronicity value (>65%) during the session is deemed to have been highly supportive of the resulting consensus, contributing to the emergent response. Conversely, the user with the low synchronicity value (<35%) during the session is deemed by the software to be obstructionist, standing in the way of compromise and consensus.

To encourage constructive behavior from participants, the CCS 102 software measures and reports each user synchronicity value after each session sending each user their personal user synchronicity value for display on their own computing device 104. In addition, when points (or credits) are awarded to the user, the number of credits or points is based at least in part on that user's user synchronicity value and/or the group cohesiveness score. In some current embodiments of the invention, user points (or credits) are awarded based 60% on that user's user synchronicity value and 40% on the overall group cohesiveness score. In this way, users are incentivized to perform collaboratively as individuals, while also being incentivized to push the swarm to behave collaboratively overall. This is highly effective.

Figure 6:
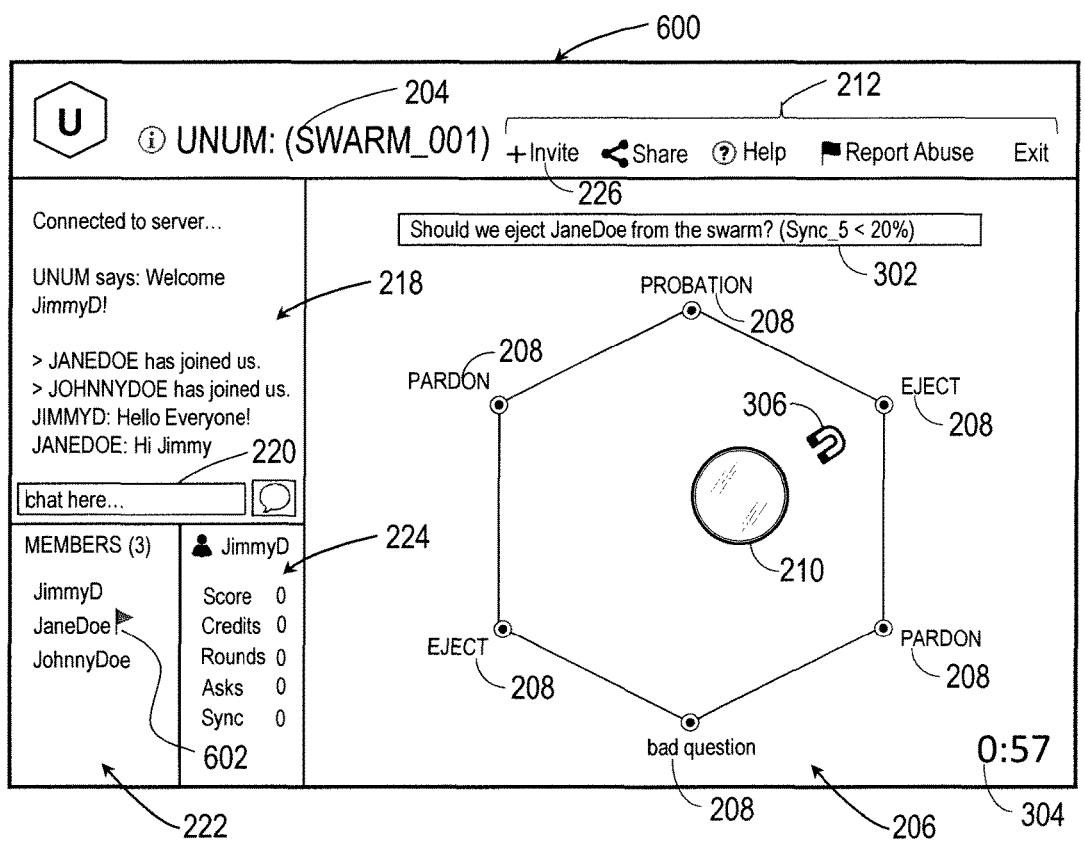
FIG. 6 is an exemplary display interface during a collaboration session determining whether to eject a specific member from the group.

Referring next to FIG. 6, an exemplary display interface 600 is shown during a session determining whether to eject a specific member from the group. Shown are the prompt bar 202, the group name 204, the target area 206, the plurality of input choices 208, the pointer 210, the communication menu 212, the chat window 218, the chat input box 220, the current member list 222, the statistics display 224, the invite button 226, the question display 302, the countdown clock 304, the magnet icon 306, and the flag icon 602.

Each group is configured to be able to eject or purge members of the group who consistently show low user synchronicity values over a certain number of sessions. In current embodiments, the determination is based on a user's average user synchronicity value over the last 5 sessions (referred to herein as that user's "Sync_5" synchronicity value) In the true spirit of collaboration, "banishment decisions" are posed to the group itself, which uses collaborative motion of the pointer 210 to decide if an identified low-performing member should be banned for low performance. The benefit of using the Sync_5 user synchronicity value is that users are not punished for a single divergent answer, or even a few divergent answers, but a string of them. This helps to differentiate between users who just disagree with a single question versus users who are deliberately being obstructionist to the swarm's overall performance. In some embodiments, the Sync_50 is also computed, which is the time average of the user's user synchronicity value over the last 50 session. This value is used in combination with the Sync_5 user synchronicity value when ejecting users from the group. This allows users to rewarded for long-term collaborative behavior. The Sync_5 user synchronicity value and the Sync_50 user synchronicity value are effective, but obviously values averaged over a different number of sessions could be used by the CCS 102 software. The key is for the software to assess a time-history of the user's user synchronicity values when determining banishment (or suggested banishment). Similarly, entry into the group can require that the user's Sync_5 user synchronicity value and/or Sync_50 user synchronicity value be above a defined threshold. This allows some groups to be highly selective, only allowing users with a track record of being collaborative members.

In fact, the present invention enables the user to create a new group by giving the new group a name, assigning it a theme, and including a description of the new group's intent and/or philosophy. In addition, the user creating the new group can assign an entry threshold value that indicates a level of historic user synchronicity value that an individual user must attain to gain access to the new group. In some embodiments the Sync_50 user synchronicity value is used. In such embodiments, the group creator might indicate that only users with a Sync_50 greater than 35% can enter the new group. This ensures that deliberately obstructionist users (based on historical performance) can't enter. The system of the present invention enables a virtual lobby interface 800 included in the display interface, the virtual lobby interface 800 indicating a plurality of distinct groups for users to join, each of the plurality of groups having a different entry threshold, or optionally no entry threshold. This enables selective groups and open groups. Users who want to have access to selective groups are thereby motivated to perform collaboratively when using the system.

Shown in FIG. 6 is an exemplary user display interface that supports the purging methodology described herein. In this example, the CCS 102 has identified that a member of the group has been assigned a Sync_5 user synchronicity value below the pre-assigned threshold (for example, a user synchronicity value below 20%). In response to this automated trigger, the CCS 102 software sends an automated question to all members of the group, asking if the low-performing member should be purged from the group.

More specifically, the question automatically posed to the group by the CCS 102 includes the unique user name of the low performing member ("JaneDoe" in the exemplary session) and an indication of the threshold that was fallen below ("Sync_5<20%" in the exemplary session). The members of the group then engage in the collaborative session, providing input in real-time that is numerically combined into the group intent. In this example, the CCS 102 software automatically sent each member of the swarm a target area including the input choices 208. In this example the set of six input choices 208 includes: "eject", "pardon", "probation", "eject", "pardon", and "bad question". The users then collaboratively provide input, enabling the swarm intelligence to converge on the target answer. If the answer is "eject", the identified user is ejected from the swarm and banned from re-joining the group for either a set amount of time, a set number of sessions, or until his or her user synchronicity value rises above the threshold level. The virtual lobby interface is described further below in FIG. 8. If the answer is "pardon", the identified user is excused of his divergent behavior and is allowed to remain in the group at the present time. If the answer is "probation", the CCS 102 software is configured to monitor the future user synchronicity values for that user, giving that user a defined amount of time (or defined number of session) to raise his user synchronicity value above the defined threshold. For example, the user may be required to get his Sync_5 user synchronicity value above 35% within the next ten sessions, or ejection of that user will automatically be executed by the CCS 102.

In some embodiments, one user of the group can initiate a purge session by clicking on a particular user's username (as shown in the list of current members) and selecting a "purge user" option from the board selection drop-down menu 214. In preferred embodiments, this can only be done if the user synchronicity value or other measure of performance of the user to be purged has fallen below the threshold value. In some such embodiments, the flag icon 602 appears in the list of current members next to the usernames of users whose user synchronicity value fell below said threshold, thus alerting the other members of the low performance, and alerting the other users that such "red flagged" users can be selected for possible purge question put to the group. As shown in FIG. 6, in the list of members the user JaneDoe has the flag icon 602 shown next to the username, indicating that user JaneDoe has the user synchronicity value below the threshold.

In some embodiments, the CCS 102 does a periodic purge that does not identify the specific username of the potentially purged user when posing the question to the group. For example, in one such embodiment, the CCS 102 automatically sends the question—"Should we purge the lowest performing member of the group?" The group must now respond. The dynamic is interesting because members of the group do not know if they are the lowest performing member. In some such embodiments, such purge sessions are triggered at regular time intervals. In other embodiments, such purge sessions are triggered when the group cohesiveness score falls below a threshold. This is highly effective because the group cohesiveness score is a representation of how collaboratively effective the group is. If the group is not being highly collaborative, as indicated by the low group cohesiveness score, it's a very effective technique for the CCS 102 to ask the group if it wants to eject its lowest performing member as a means of boosting performance. In large group, the CCS 102 can be configured to ask "Should we PURGE the lowest performing 10% of our members?" This enables the swarm to purge many members at once if they are not performing well. Again, the dynamic is quite interesting and engaging for users because they don't know if they are among the lowest 10% that will get purged. In this way, the swarm can self-moderate itself, enhancing its own configuration for optimal performance, with assistance from the automated agent of the CCS 102 software.

Figure 7:
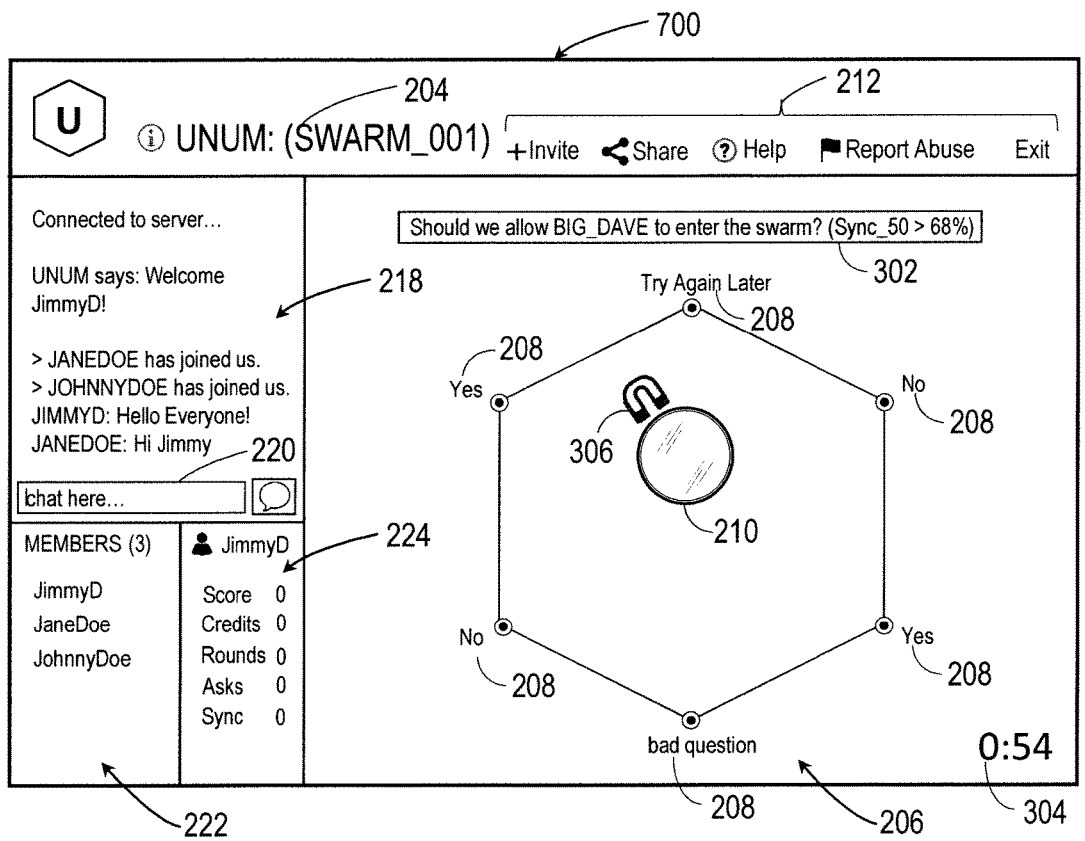
FIG. 7 is an exemplary display interface during a session determining whether to allow a specific member to join the group.

Referring next to FIG. 7, an exemplary display interface 700 is shown during a session determining whether to allow a specific member to join the group. Shown are the prompt bar 202, the group name 204, the target area 206, the plurality of input choices 208, the pointer 210, the communication menu 212, the chat window 218, the chat input box 220, the current member list 222, the statistics display 224, the invite button 226, the question display 302, the countdown clock 304, and the magnet icon 306.

In some embodiments of the present invention, the collaborative group is not only empowered to make collaborative decisions about ejection from the swarm, but is empowered to make collaborative decisions about entry into the swarm. In such embodiments, the swarm can be configured when created to be "swarm admit only" in which case, users must be collaboratively granted access. This designation (or similar designation) is displayed in the system lobby display. If the swarm is identified in the lobby display as "swarm admit only", the user may not immediately join the group, but the user may select a displayed button marked "knock". When a user knocks on a swarm (i.e. selects the knock button, whereby an indication is sent to the CCS 102 indicating that that user is requesting to join that particular group), the CCS 102 software is alerted that the user wants to enter that particular swarm and because that swarm is listed in the CCS 102 database as being "swarm admit only", the CCS 102 software executes a routine that puts the admission question to the group. The swarm intelligence can then collaboratively decide if it wants to allow the given user to join, or reject the request for admission.

As shown in FIG. 7, the CCS 102 has received an indication that the user BIG_DAVE has indicated that he or she wishes to enter the group "Swarm_001". Further, responsively the CCS 102 determined that the group Swarm_001 has been configured as "swarm admit only". In response to these conditions, the CCS 102 performs the automated routine in which it sends the question to the current users in group Swarm_001, asking if the user should be allowed to join the swarm.

More specifically, the question automatically posed to the swarm by the CCS 102 includes the unique username of the user requesting entry into the group ("BIG_DAVE") as well as an indication of that user's historical collaborative performance ("Sync_50=68%"). In some embodiments, a user rank is used instead of the user synchronicity value, indicating where that user's performance falls within the overall spectrum of users of the system. In some embodiments the CCS 102 determines an ordered rank of a plurality of users based at least in part upon at least one synchronicity value associated with each of the plurality of users. In some embodiments the CCS 102 determines an ordered rank of a plurality of groups based at least in part upon at least one group cohesiveness score associated with each of the groups.

In addition, the CCS 102 might provide a link to further stats or information about that user, possibly including a link to his or her Facebook® page or Twitter® handle. In this way, the members of the swarm can assess who this user is, and how collaborative this user has been during his prior participation within the system.

The current members of the swarm SWARM_001 then engage in the collaborative control process, providing input in real-time that is numerically combined into a singular intent of the swarm intelligence, as shown by FIG. 7. In this example, the CCS 102 software automatically sent each member of the swarm a set of input choices 208 related to allowing user entry to the group. In this example the set of six input choices 208 includes: "no", "yes", "not now", "yes", "no" and, "bad question". The users then collaboratively engage, enabling the swarm intelligence to converge on the target input choice 208. If the target is "yes", the identified user is granted entry into the swarm. If the target is "no" the identified user is not granted entry into the swarm. If the target is "not now" the identified user is informed by the CCS 102 software: "maybe . . . try again later." In this way, the collaborative swarm intelligence can control its own population, deciding who is granted entry and who is rejected. This, combined with the ability to purge members, allows for a dynamic optimization of the swarm's overall makeup, both through automated processes and by direct swarm intelligence control.

As also disclosed herein, the swarm can be configured to dynamically adjust the group configuration, not only by selectively ejecting users from the swarm and/or admitting members to the swarm but by adjusting the relative weighting of the input received from current members of the swarm. More specifically, in some embodiments, dynamic algorithms are used to increase the weighting that certain users have upon the collective pull of the pointer 210, while decreasing the weighting that other users have upon the collective pull of the pointer 210.

More specifically, the CCS 1.02 can be configured to compute and store a weighting value for each user, based on that user's historic user synchronicity values. Users who show a time history of high user synchronicity values are assigned a positive weighting value, while users who show a time history of low user synchronicity values are assigned a negative weighting value. These weighting values are updated regularly by the CCS 102, ideally after each session that a user participates in, because the user's performance during that session likely resulted in a change in his historic user synchronicity value in this way, the swarm intelligence is adapted over time, strengthening the connections (i.e. input weighting) with respect to the more collaborative users in the swarm, and weakening the connections with respect to the less collaborative users in the swarm. Hence, the collaborative swarm is dynamically adjusted in an innovative manner reminiscent of the neural networks within biological brains that optimizes its intelligence by adjusting connections.

In one specific embodiment, the CCS 102 computes the Sync_5 user synchronicity value and Sync_50 user synchronicity value for each user, based on the user's performance during multiple sessions. For example, the user might have participated in 50 sessions as a member of multiple groups. Thus the Sync_50 user synchronicity value that is stored and updated on the CCS 102 (and related database) is swarm-independent.

When inside a particular group, the CCS 102 computes the weighting value for that user based on his Sync_5 user synchronicity value and Sync_50 user synchronicity value (reflecting the user's user synchronicity value over the last 5 and last 50 questions respectively). In one such embodiment, the weighting value is computed as follows:

$$\text{User Weighting} = 0.04 * (\text{Sync\_50} - 50)/50 + 0.06 * (\text{Sync\_5} - 50)/50$$

This equation assigns a weighting value that's 40% dependent upon the user's Sync_50 user synchronicity value and 60% dependent upon the user's Sync_5 user synchronicity value, thereby giving greater importance to the user's more recent behavior, but still considering the longer term behavior of that user. Further, this equation is structured mathematically such that users who earn user synchronicity values at or near a neutral performance level of 50% have no change in weighting, and users who have user synchronicity values much higher than the neutral value of 50% have a higher weighting, this higher weighting value topping out at +10%. Users with user synchronicity values substantially below 50% are computed to have a negative weighting value that maxes out at −10%.

In this way, across a population of users, most will have close to the neutral weighting value at or around 0%, but those users who have shown a very high capacity for collaborative behavior can earn a boost in their weighting value up to +10%, while those who have shown a high tendency for obstruction can be penalized with a drop in their weighting value of as much as −10%. While the spread from −10% to +10% does not seem that significant, it means that a high performing user will easily overpower the input from a low performing user, tipping the converge trend towards the more collaborative members. (It should be noted that weighting values could be defined with a larger range, for example −20% to +20%).

In addition to the processes that allow the group to adapt over time, changing the dynamics by which questions are collaboratively answered, the present invention includes one or more user-selectable mode when asking a question that also changes the dynamics of the collaborative answer. For example, the present invention includes a user selectable mode called "gravity mode" that is accessible from the physics selection drop-down menu 216. The gravity mode is engaged during the session such that the pointer 210 experiences the restoring force that pulls the pointer 210 back to the point substantially centered among the plurality of the given input choices 208, the restoring force a function of distance from the center.

This creates a new collaborative dynamic in which members of the group must provide user input with a collective force that overcomes gravity in order to position the pointer 210 on one of the plurality of input choices 208. This significantly alters the swarm dynamics, for it now requires more than a simple plurality of users providing input to the pointer 210 in a substantially synchronized manner in order to position the pointer 210 on the target. In the standard non-gravity mode, if there were 100 users, with 51 pulling towards one answer, and 49 pulling towards another, the 51 would likely be able to position the pointer 210 on the desired target. But with gravity of sufficient restoring force, the system can be configured to require that at least 80% (i.e. 80 users of the 100 in the group at the present time) are pulling in a substantially similar direction to overcome gravity and position the pointer 210 on the desired target. This mode thus enables a high barrier for collaborative decision making, requiring the group to have more "conviction" in the resulting response.

In some embodiments, the level of gravitational force is user-selectable, thereby adjusting the level of conviction required to overcome gravity and reach the target answer.

Figure 8:
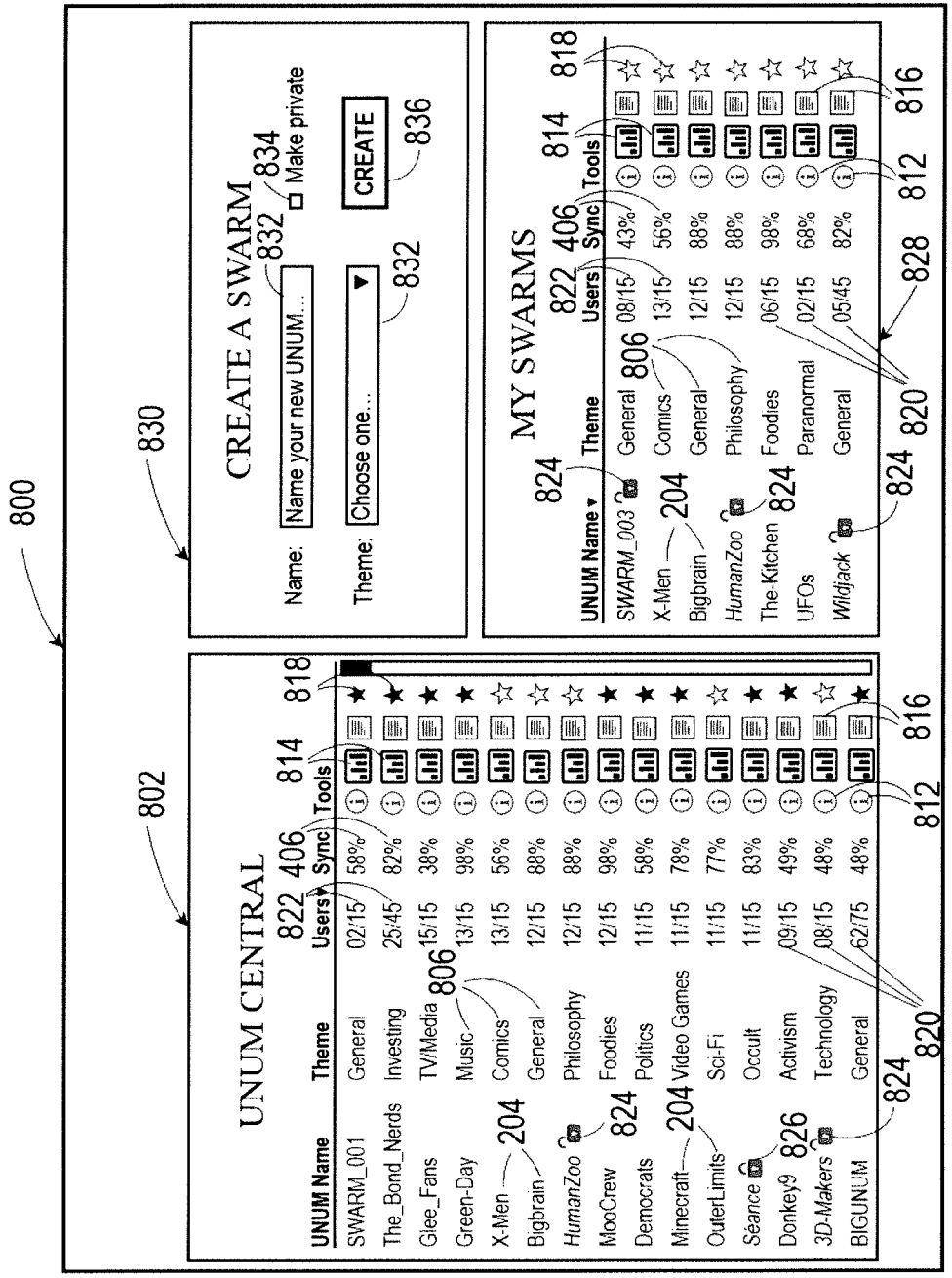
FIG. 8 is an example display interface of the virtual lobby interface.

Referring finally to FIG. 8, an example display interface of the virtual lobby interface 800 is shown. Shown are a group directory 802, the plurality of group names 204, a plurality of group themes 806, a plurality of group cohesiveness score indications 406, a plurality of information icons 812, a plurality of statistics icons 814, a plurality of log icons 816, a plurality of favorites icons 818, a number of users in the group 820, a plurality of maximum number of users 822, a plurality of unlocked icons 824, a locked icon 826, a favorites section 828, a swarm creation section 830, a plurality of user input areas 832, a make private selection box 834, and a create button 836.

The virtual lobby interface 800 is accessible to computer users on computing devices 104 either through the CIA running on their computing device 104, or through a standard web browser (if the virtual lobby interface 800 is created as a standard html webpage). As shown in FIG. 8, the virtual lobby interface 800 includes the group directory 802 of available groups that users can join and then participate in real-time collaborative intelligence processes. The virtual lobby interface 800 is not real-time, but employs more traditional methods known to the art when joining chat rooms. The virtual lobby interface 800 is divided into a number of sections. One section is the group directory 802 labeled as "UNUM Central". Using the group directory 802, users can browse the available groups, each of said groups being associated with a theme that governs the type of questions that users will ask.

The group directory 802 in the embodiment shown comprises a table, with a row for each group included in the directory. Information included in the row for each group includes the group name 204, the group theme 806, the current number of users in the group 820, the maximum number of users 822, and the current group cohesiveness score. The group theme 806 is a general description of the area of focus for the group, for example, investing, music, politics or technology.

If the group cohesiveness score is low, users may not want to enter that swarm because it means the group is not being highly collaborative. The low group cohesiveness score impacts the enjoyability of the session as well as limits the scores (credits) that users can earn.

Also included in the row for each group is a plurality of tool icons. Included in the tool icons of the exemplary lobby interface 800 of FIG. 8 are the information icon 812, the statistics icon 814, the log icon 816, and the group member icon. When the user selects the information icon 812 for one group, a display of additional information about that swarm is shown. When the user selects the statistics icon 814, a display of statistics of the group is shown. Statistics may include a number of questions asked by the group during one or more periods of time, an average number of users that participated in the group during one or more periods of time, and the average group cohesiveness of the group during one or more periods of time. The average group cohesiveness may be determined by finding the mean of a series of repeated group cohesiveness scores over a specific period of time. In some instances the mean is time-weighted such that time-steps near the end of the time period are more heavily weighted than time steps near the start of the time period. In some embodiments the period of time may comprise a plurality of completed question-and-answer sessions.

When the log icon 816 is selected by the user, a display of a log prior questions and answers of that swarm is displayed. The log display has been disclosed in the related applications. The log display may optionally include the ability not just to see the questions and answers, but also access the replay of those questions and answers. To achieve this, the CCS 102 archives not just a history of questions and answers for each swarm, but archives the replay data associated with each of said questions and answers. In some preferred embodiments, the replay data includes locative data for the pointer 210 and each of the magnet icons 306, said data stored at regular time intervals over the period of a response to a question. For example, pointer location coordinates along with magnet icon 306 positions, orientations, and size data may be stored every 0.25 seconds during the period of the response to the question. In addition, data related to the pointer 210 being over input choices 208 may also be stored. In some preferred embodiments, magnet icon 306 data is stored relative to pointer 210 location, for example as a distance vector from the center of the pointer 210, the distance vector having a size and orientation relative to the center of the pointer 210.

The favorites icon 818 indicates which of the groups are included in a "favorites" list. In one embodiment the favorites list includes groups that user has selected as favorites, groups that have been created by the user, and private swarms that the user has been invited to. For the groups shown in the portion of the group directory 802 displayed in FIG. 8, the groups includes in the user's favorites are X-Men, Bigbrain, HumanZoo, OuterLimits, and 3D-Makers groups, as indicated by the highlighted (white) star icon. Groups not included in the user's favorites list are indicated by the unhighlighted (black) star icon.

Some groups displayed in the group directory 802 are configured to have limitations to group membership, as previously described. These groups are indicated by either the locked icon 826 or the unlocked icon 824 next to the group name 204. In the group directory 802 portion shown, the HumanZoo and 3D-Makers groups include the unlocked icon 824, indicating that it is currently possible to join those groups if the membership limitations are met. The Séance group includes the locked icon 826, indicating that it is not possible to join that group at this time.

The locked icon 826 may be displayed for one of a plurality of reasons, for example—the swarm may be locked because it is private and requires an invitation or password to be joined by the user. The swarm may be locked because it has an entry threshold such that users must have scores and/or statistics related to their historical performance that are above the entry threshold to be granted access. The swarm may be locked because the swarm is configured to require group approval for new users joining. The swarm may be locked because it has reached its real-time group size limit and thus cannot accept any additional users at the present time.

As also shown in FIG. 8, the swarm creation section 830 allows users to create their own swarm. By entering information into the user input areas 832 of the swarm creation section 830, and then selecting the create button 836, the user can define the name of a new swarm, give the new swarm a theme, and optionally make the new swarm a private swarm that requires a password, by selecting the make private selection box 834. In some embodiments, users are further given the ability to invite their friends to the new swarm by accessing their Facebook® friends and/or Twitter® followers.

As also shown in FIG. 8, the favorites section 828 of the display interface allows users to track swarms that are of particular interest to them. The favorites section 828 comprises a table including the swarms included in the user's favorites list. The favorites section 828 is formatted similarly to the group directory 802 table, including the UNUM name, theme, number of users 820, maximum number of users 822, and icons 812, 814, 816, 818 for each swarm included in the favorites section 828. The favorites section 828 may also include the locked icon 826 or the unlocked icon 824 for the group, as applicable.

In this way, the present invention allows users to enter swarms, exit swarms, and create swarms. The historical performance for users (for example their score, credits, ranking, rating, and synchronicity values) are maintained by the CCS 102 for participation across all swarms. Thus a user can earn points by participating in a variety of swarms, public and private, although they can only be in one swarm at a time. That's because swarms require real-time participation.

In addition to defining the name, theme, and password of a given swarm, users are given the ability to configure new swarms by setting parameters that indicate: (a) whether the new swarm is private or public, (b) whether the new swarm supports adaptive weighting or all users should always have equal weighting, (c) whether the swarm supports automated purging or the purging of users should always be user initiated, (d) whether the swarm is supports "swarm admit only" or anyone can join the swarm without the swarm intellect making an assessment, (e) whether the swarm supports an entry threshold and if so, what level it should be, (f) whether the swarm supports an ejection threshold and if so, what the level should be. In addition, each swarm can be linked to one or more official Twitter® accounts, for the sending of Tweets that represent the official voice of that swarm intelligence.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for determining a user performance value of each user of a group of users participating in a plurality of real-time collaborative sessions over a time period, wherein each user of the group is associated with a computing device in networked communication with a collaboration server, wherein during each collaborative session each computing device in real-time repeatedly determines a user intent from user input to the computing device, the user intent having an angular direction, and sends the user intent to the collaboration server, the collaboration server performing the steps of:
    receiving, during a first collaborative session, in real-time from each computing device the corresponding user intent;
    determining, during the first collaborative session, in real-time a group intent, having an angular direction, from the plurality of real-time user intents received from the plurality of computing devices;
    determining, during the first collaborative session, a degree of alignment between the angular direction of each user intent and the angular direction of the group intent;
    determining, during the first collaborative session, the user performance value for each user based at least in part upon the degree of alignment between the user intent associated with that user and the group intent, whereby a user performance value is determined for each user for each of the multiple time steps;
    determining, during the first collaborative session, a weighting value for each of the plurality of users based at least in part on the user performance value associated with the user;
    receiving, during a second collaborative session including display on a display of each computing device of a graphical object in a location relative to a set of targets, in real-time from each computing device the corresponding user intent;
    applying, during the second collaborative session, the weighting value to the corresponding user intent;
    determining, during the second collaborative session, the real-time group intent based on the weighted user intents;
    determining, during the second collaborative sessions, an updated graphical object location based on the plurality of weighted user inputs; and
    sending, during the additional collaborative session, the updated graphical object location to the plurality of computing devices, whereby the updated graphical object location is displayed on each of the plurality of computing devices.

2. The method for determining the user performance value of claim 1, wherein the user performance value has an upper bound, wherein the user performance value at the upper bound indicates that the user intent was substantially aligned with the group intent.

3. The method for determining the user performance value of claim 1, wherein the user weighting value is determined such that the user weighting value increases the contribution of the user when the user intents and the group intents used to determine the user performance value are more aligned and decreases the contribution of the user when the user intents and group intents are less aligned.

4. The method for determining the user performance value of claim 1, wherein the user performance value has a lower bound, wherein the user performance value at the lower bound indicates that the user intent was substantially misaligned with the group intent.

5. The method for determining the user performance value of claim 4, wherein the user intent is determined to be substantially misaligned with the group intent when the degree of alignment is such that the user intent and group intent are substantially opposite.

6. The method for determining the user performance value of claim 1, wherein an average user performance value for one user over a second time period including a plurality of selected time steps is computed by finding the mean of the user performance values for the plurality of selected time steps.

7. The method for determining the user performance value of claim 6, wherein the second time period substantially coincides with the collaborative session time period over which the group collaboratively moves at least one of the at least one graphical object to a select an answer from a plurality of displayed choices in response to a displayed question.

8. The method for determining the user performance value of claim 6, wherein the average user performance value is time-weighted such that selected time steps near the end of the second time period are more heavily weighted than selected time steps near the start of the second time period.

9. The method for determining the user performance value of claim 1, wherein a number of credits are awarded to at least one user based at least in part on the user performance value of that user.

10. The method for determining the user performance value of claim 9, wherein the credits are redeemable by the user for the right to ask a question to the group, said question to be answered through an additional collaborative session.

11. he method for determining the user performance value of claim 1, further comprising the step of determining by the collaboration server of an ordered ranking of the plurality of users, the ordered ranking based at least in part upon at least one user performance value associated with each of the plurality of users.

12. The method for determining the user performance value of claim 1, wherein an assessment of the at least one user is determined based at least in part upon the user performance value of each user assessed.

13. The method for determining the user performance value of claim 12, wherein the assessment indicates where each assessed user is one of at least "flexible" or "entrenched".

14. The method for determining the user performance value of claim 12, wherein the assessment indicates where each assessed user is one of at least "constructive" or "destructive".

15. The method for determining the user performance value of claim 1, comprising ejecting at least one user from the group based at least in part upon one user performance value associated with that user.

16. The method for determining the user performance value of claim 1, further comprising selectively allowing a new user to join the group based at least in part upon a previously generated user performance value associated with the new user, said previously generated user performance value indicating a performance level of the new user in at least one prior collaborative session.

17. A method for determining a group cohesiveness score of a group of individual users participating in a collaborative control session over a time period, wherein each user of the group is associated with an individual computing device in networked communication with a collaboration server, wherein during the collaborative session each computing device in real-time repeatedly determines a user intent from user input to the computing device, the user intent having an angular direction, and sends the user intent to the collaboration server, the collaboration server during each of multiple time steps of the collaborative session performing the steps of:
 receiving in real-time from each of the computing device the corresponding user intent;
 determining in real-time a group intent, having an angular direction, from the plurality of real-time user intents received from the plurality of computing devices;
 determining in real-time a degree of alignment between the angular direction of each user intent and the group intent;
 determining an average of the degree of alignment for the group;
 determining a running average of the degree of alignment for the collaborative session over a selection of the multiple time steps;
 determining in real-time a group cohesiveness score based at least in part on the running average of the degree of alignment; and
 modulating the make-up of the group by at least one selected from the group of actions comprising ejecting at least one user from the group based at least in part upon a determination that the ejected user's real-time user intents were poorly aligned with the group intents over a period of time and selectively allowing a new user to join the group based at least in part upon a previously generated user performance value associated with the new user, said previously generated user performance value indicating a performance level of the new user in at least one prior collaborative session.

18. The method for determining the group cohesiveness score of claim 17 wherein the collaborative session includes the group of individual users responding to a question by moving at least one graphical object to one of a plurality of input choices displayed on each computing device.

19. The method for determining the group cohesiveness score of claim 17 wherein the group cohesiveness score has an upper bound wherein the upper bound indicates that the plurality of real-time user intents are substantially aligned with each other.

20. The method for determining the group cohesiveness score of claim 17, wherein the group cohesiveness score has a lower bound wherein the lower bound that indicates that the plurality of real-time user intents are substantially misaligned with each other.

21. The method for determining the group cohesiveness score of claim 20, wherein the plurality of real-time user intents are determined to be substantially misaligned when a summation of the user intent directions results in a substantially zero resultant.

22. The method for determining the group cohesiveness score of claim 17, further comprising the step of determining an average group cohesiveness score for the group of users for a second time period including a plurality of selected time steps by finding the mean of the group cohesiveness scores during the plurality of selected time steps.

23. The method for determining the group cohesiveness score of claim 22, wherein the mean is time-weighted such that selected time steps near the end of the second time period are more heavily weighted than selected time steps near the start of the second time period.

24. The method for determining the group cohesiveness score of claim 22, wherein the mean group cohesiveness score is included in a social media message that also includes an associated answer collaboratively selected by the group.

25. The method for determining the group cohesiveness score of claim 17, wherein a number of credits are awarded to each of the individual users based at least in part on the group cohesiveness score.

26. The method for determining the group cohesiveness score of claim 25, wherein the credits are redeemable by each of the users for the right to ask a question to the group of users, said question to be answered through an additional collaborative session.

27. The method for determining the group cohesiveness score of claim 17, further comprising the step of ranking of the group of users with respect to additional groups of users based at least in part upon at least one group cohesiveness score.

28. The method for determining the group cohesiveness score of claim 17, further comprising the step of providing an assessment of the group based at least in part on at least one of the group cohesiveness scores.

29. The method for determining the group cohesiveness score of claim 28, wherein the assessment indicates where the group is one of at least "flexible" or "entrenched".

30. The method for determining the group cohesiveness score of claim 17, wherein the period of time includes the collaborative session and at least one additional collaborative session.

31. The method for determining the group cohesiveness score of claim 17, further comprising the step of repeatedly reporting and repeatedly displaying the group cohesiveness score to each of the plurality of computing devices.

32. The method for determining the group cohesiveness score of claim 17, wherein the group cohesiveness score is expressed as a percentage from 0% to 100%.

* * * * *

UNITED STATES PATENT AND TRADEMARK OFFICE
CERTIFICATE OF CORRECTION

PATENT NO. : 10,122,775 B2
APPLICATION NO. : 14/859035
DATED : November 6, 2018
INVENTOR(S) : Rosenberg Page 1 of 1

It is certified that error appears in the above-identified patent and that said Letters Patent is hereby corrected as shown below:

In the Specification
Column 1, Line 5, below "SYSTEMS" insert --This application claims the benefit of U.S. Provisional Application No. 62/066,718 entitled SYSTEM AND METHOD FOR MODERATING AND OPTIMIZING REAL-TIME SWARM INTELLIGENCES filed Oct. 21, 2014, which is incorporated in its entirety herein by reference--.
Column 1, Lines 15-23, delete "This application is a continuation-in-part of U.S. Application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application 61/970,855 entitled METHOD AND SYSTEM FOR ENABLING A GROUPWISE COLLABORATIVE CONSCIOUSNESS, filed Mar. 26, 2014, both of which are incorporated in their entirety herein by reference.".

In the Claims
Claim 11, Column 29, Line 14, delete "he" and insert --The--.

Signed and Sealed this
Twelfth Day of February, 2019

Andrei Iancu
*Director of the United States Patent and Trademark Office*